United States Patent [19]
Kihara et al.
[11] 3,831,198
[45] Aug. 20, 1974

[54] MAGNETIC RECORDING AND/OR REPRODUCING APPARATUS

[75] Inventors: Nobutoshi Kihara; Takashi Nakagawa, both of Tokyo, Japan
[73] Assignee: Sony Corporation, Tokyo, Japan

[22] Filed: July 6, 1973
[21] Appl. No.: 376,952

[30] Foreign Application Priority Data
July 8, 1972 Japan........................47-80753[U]

[52] U.S. Cl......................... 360/85, 360/71, 360/130
[51] Int. Cl.... G11b 15/66, G11b 23/04, G11b 5/52
[58] Field of Search........... 179/100.2 ZA, 100.2 Z, 179/100.2 T, 100.2 S; 274/4 C

[56] References Cited
UNITED STATES PATENTS

| | | | |
|---|---|---|---|
| 3,647,984 | 3/1972 | Watanabe | 179/100.2 ZA |
| 3,673,348 | 6/1972 | Larkin | 179/100.2 ZA |
| 3,681,539 | 8/1972 | Eibensteiner | 179/100.2 ZA |
| 3,721,776 | 3/1973 | Inaga | 179/100.2 T |
| 3,740,495 | 6/1973 | Kihara | 179/100.2 ZA |

*Primary Examiner*—Alfred H. Eddleman
*Attorney, Agent, or Firm*—Lewis H. Eslinger, Esq.; Alvin Sinderbrand, Esq.

[57] ABSTRACT

In a magnetic recording and/or reproducing apparatus that includes a cylindrical tape guide drum with at least one rotary magnetic head moved in a circular path substantially coinciding with the periphery of the drum, a tape supply, such as, a cassette containing reels on which a magnetic tape is wound, a holder spaced from the guide drum for receiving and positioning the cassette and a capstan spaced from the guide drum; a support ring is rotatable around the drum between inactive and active positions in an arcuate path that extends adjacent the holder and capstan, tape engaging members including a pinch roller are mounted on the support ring and movable with the latter for extending into the cassette and engaging the tape between the reels with the support ring in its inactive position and for withdrawing a progressively extended loop of the tape from the cassette and wrapping the extended tape loop about at least a portion of the guide drum periphery in response to movement of the support ring to its active position at which the pinch roller is located within the tape loop adjacent the capstan, and an actuating device is operative only during recording and reproducing operations of the apparatus, for example, by energizing of a solenoid, for pressing the pinch roller against the capstan so that the latter drives the tape therebetween and such actuating device is otherwise effective for locking or securely holding the pinch roller away from the capstan with the support ring in its active position so that the tape can remain wrapped about the guide drum, for example, during fast forward and rewinding operations, without the danger that the resulting increased tape tension will move the pinch roller against the capstan.

12 Claims, 6 Drawing Figures

MAGNETIC RECORDING AND/OR REPRODUCING APPARATUS

BACKGROUND OF THE INVENTION

1. Field of the Invention

This invention relates generally to magnetic recording and/or reproducing apparatus, such as, video tape recording and reproducing apparatus (VTR), and more particularly is directed to improvements in an automatic tape loading and unloading device for such apparatus.

2. Description of the Prior Art

Existing video tape recording and reproducing apparatus generally comprise a tape guide drum having a rotary magnetic head assembly associated therewith to record or reproduce video signals on a magnetic tape which is usually wound on supply and take-up reels with the tape between such reels being wrapped about at least a portion of the circumferential surface of the drum and being driven by a cooperating capstan and pinch roller and by suitable rotation of the take-up reel. In preparing such a video tape recording and reproducing apparatus for operation, the tape extending between the supply and take-up reels must be placed around or wrapped about at least a portion of the drum circumference so that the tape will be guided thereby with respect to the rotary magnetic head assembly. In the conventional apparatus, it has generally been necessary for the user to manually thread the tape from the supply reel through various guide members, around the guide drum and between the capstan and pinch roller, and then back to the take-up reel. Further, upon the completion of the recording or reproducing of video signals on a particular magnetic tape, it has been necessary for the user to manually remove the tape from the guide drum and then to manually rotate the supply or take-up reel for returning the resulting loose tape thereto prior to the removal of the reels from the apparatus. The foregoing operations require considerable manual dexterity and are time consuming. When the supply and take-up reels are contained in a cassette, the manual loading and unloading of the tape about the guide drum is particularly difficult to accomplish. If the tape is not properly threaded, damage to the tape and defective recording or reproducing of the signals may result. Further, if there is foreign matter on the user's fingers when handling the tape during the manual loading or unloading of the tape about the guide drum, such foreign matter can be transmitted to the tape and may adversely affect the fidelity of the recording or reproducing of the signals.

Automatic tape loading and unloading devices have been previously proposed to avoid the above-mentioned disadvantages. For example, a particularly desirable automatic tape loading and unloading device for a video signal recording and/or reproducing apparatus is disclosed in detail in copending U.S. Pat. application Ser. No. 354,992, filed Apr. 27, 1973, and having a common assignee herewith. In such automatic tape loading and unloading device, a rotatable support member, for example, in the form of a ring, is turnable around the guide drum in an arcuate path that extends under a cassette containing the supply and take-up reels when the cassette is received and positioned by a holder therefor, a tape engaging member is carried by the support ring and extends into an opening of the cassette for engagement with the tape therein when the ring is in an inactive or starting position, such tape engaging member drawing a loop of tape from the cassette and wrapping one side of the tape loop about the guide drum upon turning of the ring to an active position during a tape loading operation, and a pinch roller is mounted on the support ring adjacent the tape engaging member to also extend into the cassette opening with the support ring at its starting position and to be disposed within the tape loop produced by movement of the support ring to its active position at which the pinch roller is adjacent a capstan with the tape extending between the pinch roller and capstan. In the foregoing tape loading and unloading device, the pinch roller is mounted on the support ring by means of a pivoted arm so that, with the support ring at its active position, the pinch roller can be pressed against the capstan for driving the tape therebetween by means of the rotated capstan during recording and reproducing or playback operations of the apparatus. However, in fast-forward or rewinding operations of the apparatus during which the tape is to be driven by rotation of the take-up or supply reel, respectively, without resistance from the capstan, the relatively high tension occurring in the tape and acting on the pinch roller may inadvertently move the latter against the capstan and cause grabbing of the tape therebetween.

Accordingly, in the above described tape loading and unloading device and in other devices provided for similar purposes, the tape is unloaded from the guide drum and returned fully to the take-up and supply reels within the cassette prior to the initiation of a fast-forward or rewinding operation of the apparatus. Thus, after each fast-forward or rewinding operation, it is necessary to effect a tape loading operation before recording or reproducing signals on the tape. The tape unloading and loading operations before and after each fastforward or rewinding operation are obviously time-consuming and result in increased wear on the tape loading and unloading device and on the tape being manipulated thereby.

SUMMARY OF THE INVENTION

Accordingly, it is an object of this invention to provide a magnetic recording and/or reproducing apparatus of the described type with an automatic tape loading and unloading device which permits fast-forward and rewinding operations to be safely performed with the tape in its loaded condition, that is, wrapped about at least a portion of the guide drum periphery.

Another object is to provide an automatic tape loading and unloading device, as aforesaid, which is relatively simple in construction and operation, and which is also relatively compact so as to minimize the space required for such device.

Still another object is to provide an automatic tape loading and unloading device which is thoroughly reliable in its operation.

A further object is to provide a magnetic recording and/or reproducing apparatus with an automatic tape loading and unloading device, as aforesaid, which permits the rapid changeover of the apparatus from a recording or reproducing operation to a fast-forward or rewinding operation and then back to a recording or reproducing operation.

A still further object is to provide a magnetic recording and/or reproducing apparatus with an automatic tape loading and unloading device which avoids the development of slackness in the tape by reason of the operation thereof.

In accordance with an aspect of the invention, a magnetic recording and/or reproducing apparatus of the described type having an automatic tape loading and unloading device that comprises tape engaging members including a pinch roller mounted on a support ring and movable with the latter for extending into a cassette and engaging the tape between the reels with the support ring in its inactive position and for withdrawing a progressively extended loop of the tape from the cassette and wrapping the extended tape loop about at least a portion of the guide drum periphery in response to movement of the support ring to its active position at which the pinch roller within the loop is located adjacent the capstan with the tape of the extended loop therebetween, is provided with an actuating device operative only during recording and reproducing operations of the apparatus, for example, by energizing of a solenoid, for pressing the pinch roller against the capstan so that the latter drives the tape therebetween and such actuating device is otherwise effective for locking or securely holding the pinch roller away from the capstan with the support ring in its active position so that the tape can remain wrapped about the guide drum, for example, during fast-forward and rewinding operations, without the danger that the resulting increased tape tension will move the pinch roller against the capstan.

It is a further feature of this invention to provide an apparatus, as aforesaid, with a braking arrangement controlled in response to turning of the support ring to brake the rotation of the take-up and supply reels as the support ring nears its active position, and thereby to avoid slackness in the tape at the conclusion of the tape loading operation.

The above, and other objects, features and advantages of this invention, will be apparent from the following detailed description of an illustrative embodiment thereof which is to be read in connection with the accompanying drawings.

DESCRIPTION OF THE PREFERRED EMBODIMENT

Figure 1:
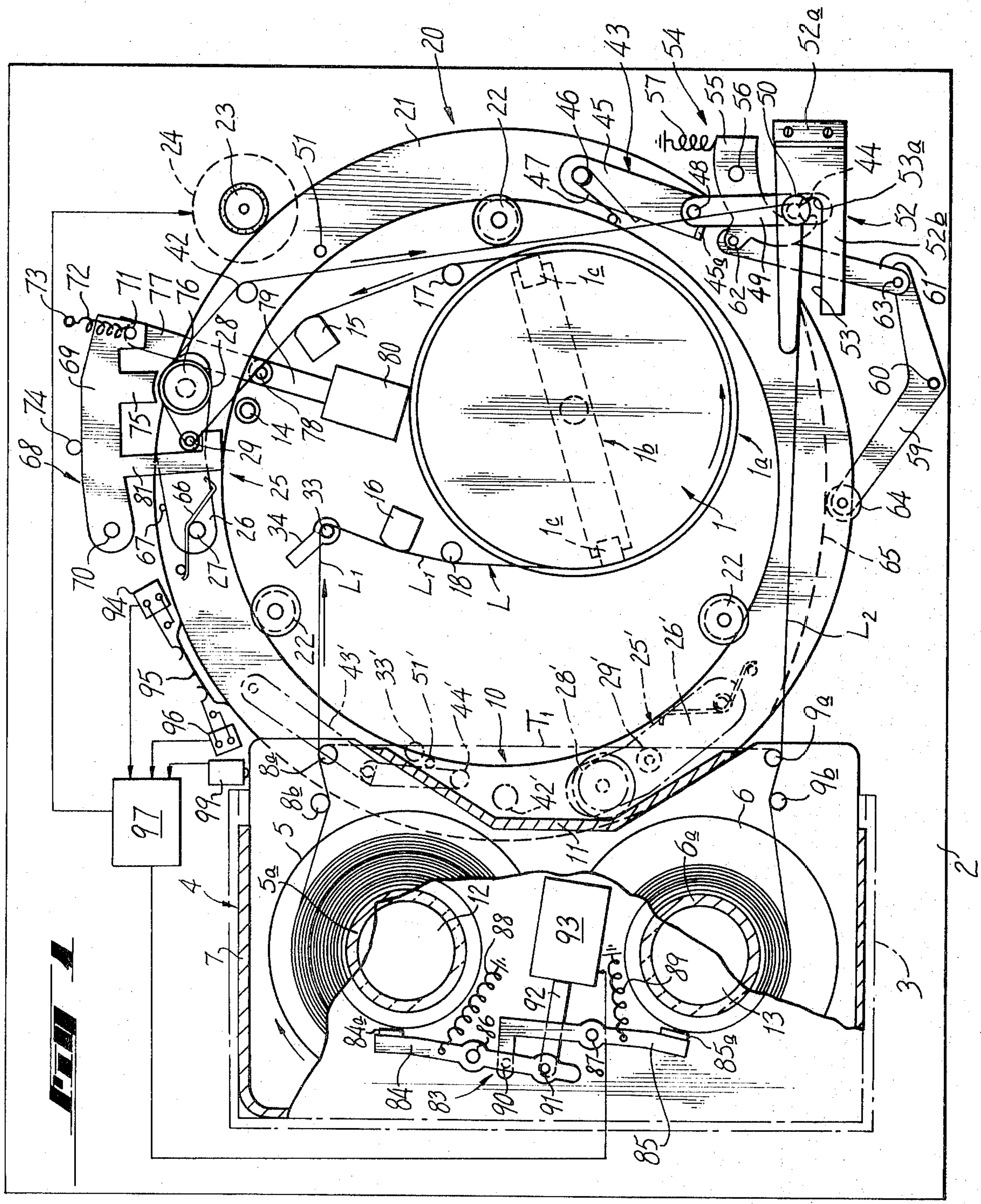
FIG. 1 is a schematic top plan view of a magnetic recording and/or reproducing apparatus provided with a tape loading and unloading device according to an embodiment of this invention, and which is shown in the condition thereof for a fast-forward or rewinding operation of the apparatus.

Referring to the drawings in detail, and initially to FIG. 1 thereof, it will be seen that, in a magnetic recording and/or reproducing apparatus of the type to which this invention may be applied, a cylindrical tape guide drum 1 is mounted on a chassis 2 and has a circumferential slot or gap 1*a* (FIG. 6), and a rotary magnetic head assembly 1*b* (appearing in broken lines on FIG. 1) is rotatably mounted in drum 1 and includes one or more magnetic heads 1*c* which are moved along the slot or gap, that is, in a circular path substantially coinciding with the peripheral surface of drum 1.

A cassette holder 3, indicated schematically in broken lines, is suitably mounted on chassis 2 at one side of guide drum 1 for movement between a raised position, in which holder 3 is adapted to receive a tape cassette 4, and a lowered or operative position, in which the cassette is positioned for a recording or reproducing operation. The tape cassette 4 is shown to include a supply reel 5 and a take-up reel 6 rotatably contained within a housing 7 and having a magnetic tape T wound thereon. The tape T extending between reels 5 and 6 is guided about guide pins 8*a* and 8*b* adjacent reel 5 and about guide pins 9*a* and 9*b* adjacent reel 6 so as to normally follow a path including a run, indicated in broken lines at $T_1$, between guide pins 8*a* and 9*a* at which the tape is exposed through an opening 10. The opening 10 extends along the side and bottom portion of housing 7 which is directed toward guide drum 1 when cassette 4 is received by holder 3. Access to the interior of cassette housing 7 through opening 10 is limited by a partition 11 which extends along the edge of opening 10 in the bottom wall of housing 7 from near guide pin 8*a* to near guide pin 9*a*, and which is spaced inwardly from the run $T_1$ of the tape.

Reel support shafts 12 and 13 extend upwardly from chassis 2 and are respectively engageable by the hubs 5*a* and 6*a* of supply reel 5 and take-up reel 6 when holder 3 is lowered to its operative position with the cassette 4 received therein. Suitable drive assemblies (not shown) may be provided for driving take-up reel support shaft 13 in the direction winding the tape T on take-up reel 6 during recording, reproducing and fast-forward operations of the apparatus, and for driving supply reel support shaft 12 in the direction for rewinding the tape on supply reel 5 during rewinding operation of the apparatus.

The recording and/or reproducing apparatus is further shown to include a capstan 14 which is suitably driven from a drive motor (not shown), a fixed magnetic head assemply 15 for recording and/or reproducing audio and control signals, an erasing head 16 and tape guides 17 and 18, all of which are mounted on chassis 2 at predetermined spaced apart positions. In order to perform a recording or reproducing operation with the described apparatus, it is necessary to load the tape from cassette 4 on holder 3 about at least a portion of the circumferential surface of guide drum 1 for scanning by the rotary magnetic head assembly 1*b* associated with the guide drum, and further to engage the magnetic tape with capstan 14 so that the latter will drive the tape and also with the fixed magnetic heads 15 and 16. When it is desired to remove the cassette 4 from the apparatus at the conclusion of a recording or reproducing operation, it is necessary to unload the tape from about drum 1 and to return the tape to the cassette 4.

In order to automatically perform the above described tape loading and unloading functions, the illustrated apparatus is further shown to have a device 20 of the type disclosed in detail in the previously mentioned U.S. Pat. application Ser. No. 354,992. Such tape loading and unloading device 20 generally includes a support member 21 which is preferably in the form of a ring, as shown, and which is rotatable about guide drum 1 in a circular or arcuate path that extends under the opening 10 of a cassette 4 positioned by the holder 3. The support ring 21 is shown disposed eccentrically with respect to guide drum 1, as shown on FIG. 1, to provide a relatively large space therebetween, at the back of drum 1, for accommodating capstan 14, heads 15 and 16 and tape guides 17 and 18. Support ring 21 is rotatably supported by grooved rollers 22 which engage the inner periphery of ring 21 and which are suitably mounted above chassis 2. In order to effect turning of support ring 21 about guide drum 1, the outer periphery of ring 21 is frictionally engaged by a drive roller 23 which is rotatable by a suitable reversible electric motor 24.

Mounted on support ring 21 is a pinch roller assembly 25 which is shown to include a support arm 26 pivoted, at one end, on a pin 27 projecting upwardly from ring 21, a freely rotatable, upstanding pinch roller 28 carried by the opposite or free end portion of arm 26, and a tape engaging member or pin 29 extending upwardly from arm 26 intermediate its ends. The pinch roller assembly 25 is located on support ring 21 so that, when the support ring is turned to its active position to dispose assembly 25 as shown in full lines on FIG. 1, pinch roller 28 is adjacent capstan 14 for cooperation with the latter in driving the magnetic tape therebetween, as hereinafter described in detail.

When support ring 21 is turned in the clockwise direction through approximately 250° from its active position shown in full lines on FIG. 1 to its starting or inactive position, the pinch roller assembly is at the location indicated in broken lines at 25′ on FIG. 1. It will be apparent that, with support ring 21 at its starting or inactive position, the downward movement of holder 3 with a cassette 4 positioned thereon causes the pinch roller and the tape guiding member at the positions indicated at 28′ and 29′, respectively, to project upwardly into opening 10 of cassette housing 7 at the side of tape run $T_1$ facing away from guide drum 1.

Tape loading and unloading device 20 is further shown to include a tape guiding pin 33 projecting upwardly from one end of a support arm 34 which extends over ring 21 from a pivot pin (not shown) carried by chassis 2. Support arm 34 is urged by a spring (not shown) to a position at which tape guiding pin 33 is also located to extend upwardly into opening 10 of cassette housing 7 at the side of tape run $T_1$ facing away from guide drum 1. Tape guiding pin 33 may be moved to the position shown in full lines on FIG. 1 at the completion of a tape loading operation by means of a suitable mechanism (not shown) which is actuated by support ring 21 as the latter is turned in the counterclockwise direction and nears its active position. An upstanding tape guide pin 42 is also shown to be mounted on support ring 21 at a fixed location spaced by a relatively small distance from pinch roller 28 in the clockwise direction so that, when support ring 21 is in its starting or inactive position, such tape guiding pin will be at the location indicated in broken lines at 42′ for projecting upwardly into opening 10 of cassette housing 7 received by the lowered cassette holder 3.

The illustrated tape loading and unloading device 20 is further shown to comprise a tape guiding assembly 43 which is mounted on support ring 21 and includes a tape guiding member or pin 44. Tape guiding member 44 is mounted on support ring 21 for movement relative to the latter from an inner position indicated in broken lines at 44′, at which such tape guiding member is spaced from pinch roller 28′ by a relatively small distance along ring 21 in the clockwise direction so as to also project upwardly into cassette opening 10 with the support ring 21 at its starting or inactive position, to an outer position shown in full lines on FIG. 1 in response to movement of the support ring to its active position during a loading operation, at which outer position tape guiding member 44 is spaced outwardly from support ring 21 and also spaced a relatively large distance from pinch roller 28 in the clockwise direction along support ring 21. In order to permit the foregoing movements of tape guiding member 44 relative to ring 21, tape guiding assembly 43 is further shown to include an arm 45 pivoted, at one end, on a pin 46 carried by ring 21 and being urged by a spring 47 in the counterclockwise direction relative to ring 21 to the position shown in broken lines on FIG. 1. The free end portion of arm 45 carries a pin 48 on which there is pivoted one end of a support arm 49 having the tape guiding member or pin 44 projecting upwardly therefrom. Further, the free end of arm 45 has an upwardly bent tab 45*a* engageable by arm 49 for limiting the clockwise turning of arm 49 relative to arm 45 to the position shown in which a relatively small or acute angle is enclosed between the line extending between the centers of pins 46 and 48 and the line extending between the centers of pins 44 and 48. When support ring 21 is in its starting or inactive position, the swinging of arms 45 and 49, as a unit, in the counterclockwise direction by spring 47 is limited to the position shown in broken lines on FIG. 1 by the engagement of arm 49 with a stop 51 on support ring 21 and by the engagement of tab 45*a* with the adjacent arm 49. With arms 45 and 49 being thus located, arms 45 and 49 extend generally along ring 21 from pivot pin 46 in the direction toward pinch roller 28, and tape guiding member or pin 44 is disposed at its inner position relatively close to pinch roller 28.

In order to move tape guiding member or pin 44 from such inner position to its outer position in response to turning of support ring 21 from its starting position to its operative position, tape loading and unloading device 20 is further shown to comprise an actuating member 52 which is fixedly located on chassis 2 at a location adjacent support ring 21 past weich pivot pin 46 moves during the turning of support ring 21 between its starting and active positions. As shown, actuating member 52 includes a base portion 52*a* secured to chassis 2 and an elongated, elevated portion 52*b* which projects from base portion 52*a* over the outer periphery of ring 21. Elevated portion 52*b* has an elongated slot 53 opening at the free end of portion 52*b* for receiving a locating pin 50 extending upwardly from guiding member 44 as ring 21 is moved from its starting or inactive position toward its active position. Slot 53 is shown to diverge from ring 21 in the direction from its open end toward its opposite end which terminates in a laterally directed locking portion 53*a*.

The illustrated tape loading and unloading device 20 further has a locking assembly 54 by which tape guiding member 44 is secured in its outer position when support ring 21 attains its operative position at the completion of a tape loading operation. As shown, locking assembly 54 includes a latch member 55 which is pivoted on a pin 56 carried by chassis 2 and urged by a spring 57 in the counterclockwise direction to engage a nose 55*a* on member 55 with a locking pin (not shown) which depends from tape guiding member 44. The engagement of latch member 55 with such locking pin is controlled by a sensing lever 59 which is pivoted, intermediate its ends, on a pin 60 carried by chassis 2, and a link 61 having its ends pivotally connected, as at 62 and 63, to latch member 55 and to one end of lever 59. The other end of lever 59 carries a cam follower roller 64 which rides upon a cam surface 65 formed on the lower portion of the outer periphery of support ring 21. When support ring 21 is at its active position with locating pin 50 of assembly 43 in locking portion 53*a* of slot 53, cam follower roller 64 engages a portion of cam 65 at a relatively small radial distance from the center of ring 21 so that spring 57 is then effective to engage the nose 55*a* of latch member 55 with the associated locking pin, and thus tape guiding member 44 is securely held in its outer position against the tension in the tape for stable guiding of the latter. However, during turning of support ring 21 to or from its operative position, cam follower roller 64 rides on portions of cam 65 at a relatively large radial distance from the center of ring 21. Thus, lever 59 is turned in the counterclockwise direction from the illustrated position on FIG. 1, with the result that link 61 turns latch member 55 in the clockwise direction to release its nose 55*a* from the associated locking pin ad thereby permit movement of locating pin 50 into, or out of the locking portion 53*a* of slot 53.

The above described tape loading and unloading device 20 operates as follows:

Starting with support ring 21 in its starting or inactive position so that the pinch roller assembly 25, tape guiding assembly 43 and tape guiding pins 33 and 42 are in the positions shown in broken lines at 25', 43', 33' and 42', respectively, on FIG. 1, a cassette 4 is disposed on holder 3 and the latter is lowered to its operative position for causing pinch roller 28', tape engaging member 29', tape guiding pins 33' and 42', and tape guiding member 44' to extend upwardly into cassette opening 10 at the side of tape run $T_1$ facing away from guide drum 1. Motor 24 is then energized, as hereinafter described, to cause drive roller 23 to turn support ring 21 in the counterclockwise direction. Such rotation of ring 21 causes tape engaging member 29 to draw a loop L of the tape T from cassette 4 and to wrap a side $L_1$ of the tape loop about the periphery of guide drum 1. It will be noted that, as the tape loop L is thus formed by tape engaging member 29, pinch roller 28, tape guiding pins 33 and 42 and tape guiding member 44 are all disposed within the tape loop. During continued turning of ring 21 in the counterclockwise direction, the tape loop L is progressively extended and its side $L_1$ is further wrapped about the periphery of guide drum 1, while the other side $L_2$ of tape loop L is engaged successively by tape guide pin 42 and tape guiding member 44 and thereby held away from the periphery of guide drum 1. In the course of the counterclockwise turning of ring 21, locating pin 50 enters slot 53 of actuating member 52 and moves along slot 53 toward the locking portion 53*a*. As pin 50 moves along slot 53 and pivot pin 46 continues in the counterclockwise direction along the circular path of ring 21, arms 45 and 49 begin to swing as a unit in the clockwise direction about pivot pin 46. When locating pin 50 reaches the closed end of slot 53 defined by locking portion 53*a*, further movement of pivot pin 46 along the circular path of ring 21 causes turning or jack-knifing of arm 49 in the counterclockwise direction relative to arm 45 and rapid turning of arm 45 in the clockwise direction about pivot pin 46. Thereafter, continued movement of pivot pin 46 in the counterclockwise direction along the circular path of ring 21, while locating pin 50 is retained in locking portion 53*a* of slot 53, causes arm 49 to turn in the clockwise direction relative to arm 45 until arm 49 again abuts against tab 45*a* on arm 45 to restore the angular relationship of arms 45 and 49 to that shown in full lines on FIG. 1. Thus, tape guiding member 44 is moved to its outer position relative to ring 21 and, in so doing, is also relatively widely spaced from the tape engaging member 29 and pinch roller 28 in the direction along support ring 21.

As support ring 21 nears its active position shown in full lines on FIG. 1, arm 34 is turned about its pivot to swing guide pin 33 to the position shown in full lines. Thus, guide pin 33 acts on the tape loop side $L_1$ between drum 1 and guide pin 8*a* to cause loop side $L_1$ to engage guide pin 18 and erase head 16. When support ring 21 attains its active position, the tape loop side $L_1$ between drum 1 and tape engaging member 19 is engaged with guide pin 17 and head assembly 15 and passes between capstan 14 and pinch roller 28 which is disposed adjacent the capstan. Thus, the tape loading operation is completed and the operation of motor 24 is discontinued, as hereinafter described.

An unloading operation may be initiated by operating motor 24, as hereinafter described, to drive support ring 21 in the clockwise direction from the position shown in full lines to the position shown in broken lines on FIG. 1. During such turning of ring 21, one or the other of reel shafts 12 and 13 may be suitably rotated to take up, on the respective reel 5 or 6, the slack tape that results from the movement of tape engaging member 29 and the consequent reduction of the size of tape loop L. Further, the action of tape guiding assembly 43 is reversed, that is, the arms 45 and 49 thereof undergo the previously described relative movements in reverse order, in passing from the condition shown in full lines on FIG. 1 to the condition shown in broken lines. Further, as ring 21 moves away from its active position, arm 34 is free to return tape guide pin 33 to the position shown in broken lines at 33' within cassette opening 10.

Upon the return of support ring 21 to its starting or inactive position, the tape T is fully unwrapped from guide drum 1 and restored to the run $T_1$ between guide pins 8*a* and 9*a* in cassette 4. Further, pinch roller 28, tape engaging member 29, tape guiding pin 42 and tape guiding member 44 are restored to the positions within cassette opening 10 as indicated in broken lines at 28', 29', 42' and 44', respectively. Thus, the holder 3 can be raised to permit the removal of cassette 4 therefrom.

In the illustrated magnetic recording and/or reproducing apparatus, a torsion or hair spring 66 extends around pivot pin 27 and acts on support arm 26 to urge the latter outwardly relative to ring 21 against a stop 67. The stop 67 is positioned so that, with support ring 21 in its active position at the completion of a tape loading operation and with arm 26 engaging stop 67, pinch roller 28 is spaced from capstan 14, as shown on FIG. 1. Thus, during a recording or reproducing operation of the apparatus, it is necessary to angularly displace support arm 26 inwardly relative to ring 21 for pressing pinch roller 28 against rotated capstan 14 and thereby causing the latter to drive the tape about guide drum 1 while suitably rotating take-up reel shaft 13.

Figure 2:
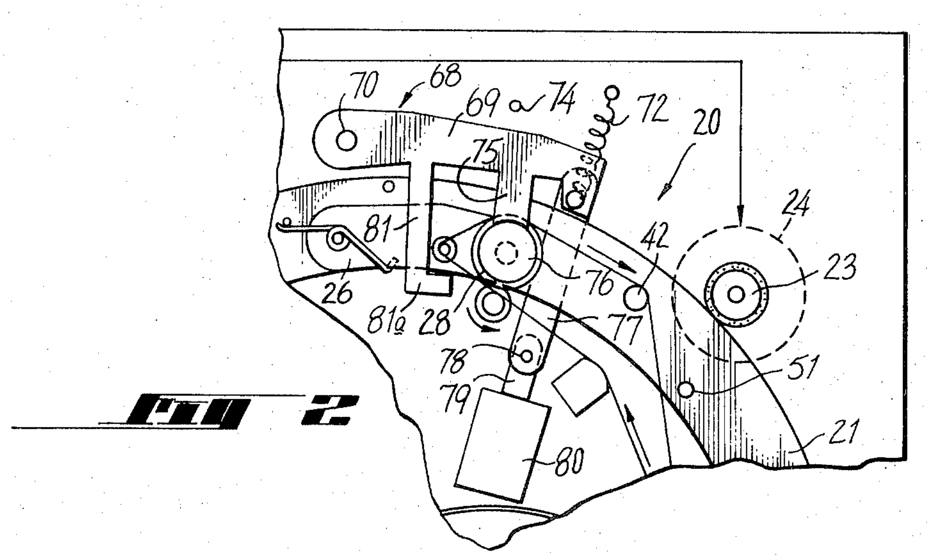
FIG. 2 is a fragmentary view similar to a portion of FIG. 1, but showing the apparatus conditioned for a recording or reproducing operation.
Figures 3, 4:
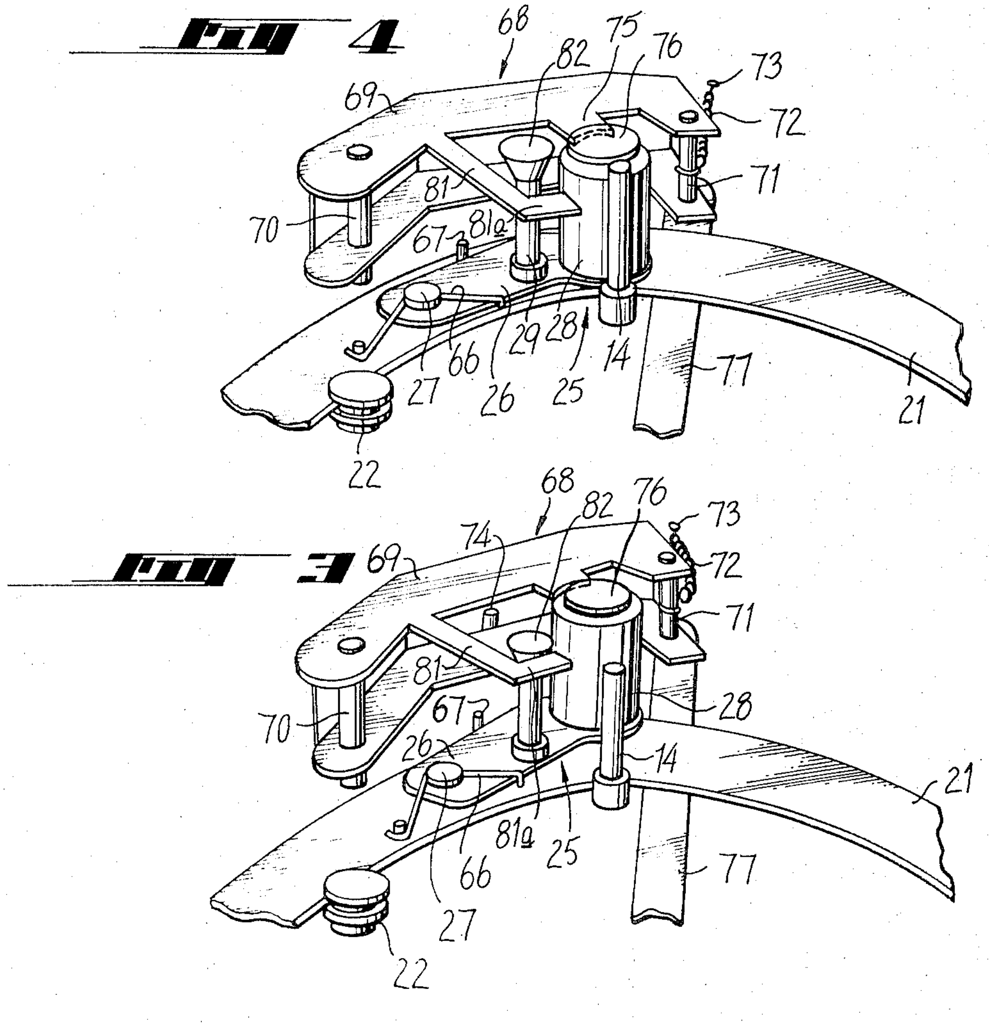
FIGS. 3 and 4 are detail perspective views of an actuating device for the pinch roller of the recording and/or reproducing apparatus and which is shown in the positions of FIGS. 1 and 2, respectively.

In accordance with the present invention, such angular displacement of support arm 26 for pressing pinch roller 28 against capstan 14 is effected by an actuating assembly 68 (FIGS. 1–4) that includes an actuating arm 69 lying outside ring 21 adjacent the location of pinch roller assembly 25 in the active position of ring 21. Actuating arm 69 is pivoted, at one end, on a pivot pin 70 extending from chassis 2, and the other or free end of arm 69 carries a pin 71 connected to one end of a relatively strong helical tension spring 72 which extends outwardly from ring 21 to an anchor 73 on the chassis. A stop 74 projects upwardly from chassis 2 at the outside of arm 69 to limit the outward swinging of actuating arm 69 under the influence of spring 72. An abutment 75 extends inwardly from arm 69 and is located so as to be engageable, when support ring 21 is in its active position, with a head 76 provided at the upper end of the axle by which pinch roller 28 is rotatably mounted on support arm 26. A link 77 is pivotally connected to the lower end of pin 71 and extends inwardly therefrom under support ring 21 to a pivotal connection at 78 with the armature 79 of a solenoid 80. When solenoid 80 is energized, as hereinafter described, armature 79 is retracted (FIG. 2) with a force that is sufficiently strong to overcome the force of spring 72 acting on actuating arm 69 and the relatively light force of spring 66 acting on support arm 26. Thus, for a recording or reproducing operation of the apparatus following the loading of the tape on guide drum 1, solenoid 80 is energized and, in response thereto, actuating arm 69 is angularly displaced inwardly toward ring 21 and abutment 75 acts against head 76 to similarly displace support arm 26 for pressing pinch roller 28 against capstan 14 and driving the tape therebetween (FIGS. 2 and 4).

On the other hand, when solenoid 80 is de-energized, spring 72 returns actuating arm 69 to its rest position against stop 74 (FIGS. 1 and 3) and link 77 draws armature 79 to its extended position. In such rest position of actuating arm 69, abutment 75 is shown to be slightly spaced from head 76 with support arm 26 held against stop 67 by spring 66. Thus, pinch roller 28 is again spaced from capstan 14 and the spacing of abutment 75 from head 76 ensures that such abutment will not interfere with movement of support ring 21 to and from its active position.

In the magnetic recording and/or reproducing apparatus embodying this invention, it is intended that support ring 21 should remain in its active position with the tape wrapped about guide drum 1 during other modes of operation, for example, during fast-forward and rewinding operations when the tape is to be transported rapidly merely by correspondingly high-speed rotation of the take-up reel shaft 13 or the supply reel shaft 12, respectively. If the tape can remain in its loaded condition during such fast-forward or rewinding operations, then at the conclusion of the latter a recording or reproducing operation can be initiated merely by again energizing solenoid 80 and without the delay required for a tape loading operation as in the case where the tape is unloaded from guide drum 1 and returned to cassette 4 before each fast-forward or rewinding operation. However, if the tape remains in its loaded condition during a fast-forward or rewinding operation, the resulting increased tension in the tape, particularly at the commencement of such an operation, acts on the tape engaging member 29 and the pinch roller 28 within the tape loop to urge support arm 26 inwardly against the light or small force of spring 66 and thereby cause undesired movement of pinch roller 28 against capstan 14. If pinch roller 28 is moved against capstan 14 during a fast-forward or rewinding operation, the tape moving at a high speed is seized therebetween with consequent damage to the tape.

In order to avoid the foregoing, the actuating assembly 68 according to this invention is further provided with a latch member 81 extending inwardly from actuating arm 69 and having a foot 81*a* at its inner end disposed at the inner side of an inverted frusto-conical cap 82 (FIGS. 3 and 4) at the upper end of tape engaging member 29. Latch member 81 is dimensional so that, when arms 26 and 69 are engaged with the respective stops 67 and 74 (FIGS. 1 and 3), foot 81*a* is spaced inwardly a small distance from cap 82 to avoid interference with movement of support ring 21 to and from its active position. When solenoid 80 is energized for a recording or reproducing operation, foot 81*a* of latch member 81 moves inwardly ahead of cap 82 as abutment 75 on actuating arm 69 acts on head 76 to move pinch roller 28 against capstan 14 (FIGS. 2 and 4). However, when solenoid 80 is de-energized, spring 72 strongly holds actuating arm 69 against stop 74 so that foot 81*a* of latch member 81 cooperates with cap 82 for blocking inward swinging of support arm 26 substantially away from its stop 67, for example, in response to an increased tension in the tape as during the commencement of a fast-forward or rewinding operation (FIGS. 1 and 3). Thus, the tape can safely remain in its loaded condition on guide drum 1 during a fast-forward or rewinding operation without the possibility of damage to the tape by reason of inadvertent movement of pinch roller 28 against capstan 14. The inverted frusto-conical configuration of cap 82 ensures that, when such cap engages foot 81*a* in response to an increased tension in the tape during a fast-forward or rewinding operation, the force of such engagement will have a downward component acting on foot 81*a* to prevent upward deflection of latch member 81 and its inadvertent disengagement from cap 82.

Figure 6:
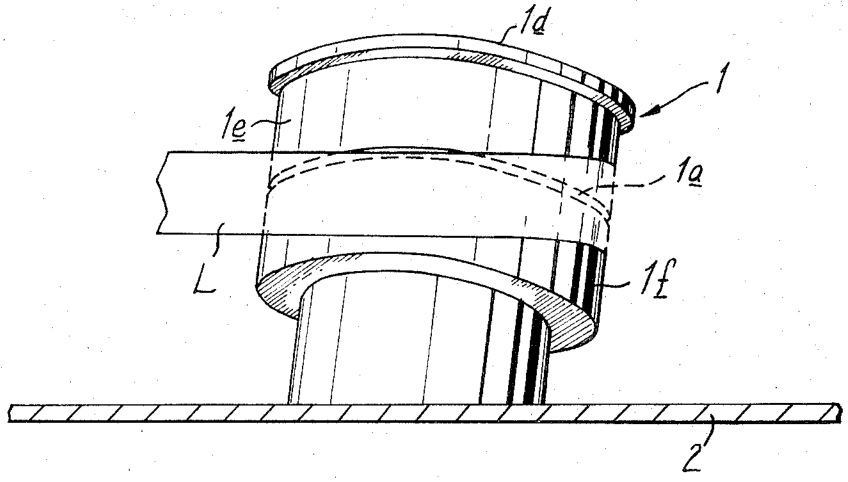
FIG. 6 is a side-elevational view of the guide drum of the recording and/or reproducing apparatus.

In order that the tape will be wrapped helically about guide drum 1 at the completion of a tape loading operation so that heads 1*c* will trace oblique tracks on the tape during recording or reproducing operations, as is conventional, guide drum 1 may be mounted on chassis 2 with its axis suitably inclined from the vertical, as shown on FIG. 6. However, with the tape wrapped helically about guide drum 1 during a fast-forward or rewinding operation, as in accordance with the present invention, there is the possibility that the increased tension in the tape occurring when the tape speed is suddenly increased at the commencement of such operation will tend to remove the tape upwardly from the guide drum. The foregoing possibility is avoided according to this invention by providing a flange 1*d* (FIG. 6) at the top of guide drum 1. Such flange 1*d* may be made integral with the top section 1*e* of the guide drum which preferably rotates with the head assembly 1*b* (FIG. 1) and which cooperates with the stationary lower section 1*f* of the guide drum to define the gap 1*a* therebetween (FIG. 6).

It has further been found that, at the conclusion of a tape loading operation of the above described device 20, slackness occurs in the tape wrapped about guide drum 1 due to the inertia of reels 5 and 6 and the respective shafts 12 and 13 which continue to rotate after support ring 21 is stopped at its active position. In order to avoid the foregoing, the apparatus according to this invention is provided with a braking device 83 (FIG. 1) which applies braking forces to reel-support shafts 12 and 13 during the final increment of the movement of support ring 21 to its active position, that is, during the concluding phase of the tape loading operation. As shown, braking device 83 includes brake arms 84 and 85 carrying respective brake shoes 84*a* and 85*a* engageable with reel-support shafts 12 and 13 and being pivotally mounted, as at 86 and 87, on chassis 2 below holder 3. Springs 88 and 89 act on brake arms 84 and 85, respectively, to urge the latter in the directions for engaging their shoes 84*a* and 85*a* with shafts 12 and 13. The arms 84 and 85 are pivotally connected, as at 90, and arm 84 is further pivotally connected at 91 to the armature or plunger 92 of a solenoid 93 so that, upon energizing of solenoid 93, the resulting retraction of armature 92 causes both arms 84 and 85 to pivot in the directions for disengaging their respective shoes 84*a* and 85*a* from shafts 12 and 13. As hereinafter described in detail, solenoid 93 is energized during recording, playback or reproducing, fast-forward and rewinding operations of the apparatus, and also during tape loading and unloading operations of device 20, whereby to release braking device 83 during such operations. However, shortly before the completion of a tape loading operation, the energization of solenoid 93 is interrupted to engage braking device 83 during the final movement of support ring 21 to its active position.

In order to achieve the foregoing, the circuit for energizing solenoid 93 during a tape loading operation of device 20 includes a normally closed switch 94 (FIG. 1) located on chassis 2 adjacent ring 21 so as to be opened by a switch actuator 95 on ring 21 during the final increment of movement of the latter to its active position at which switch actuator 95 also opens a normally closed switch 96 interposed in the circuit provided for operating motor 24 during the tape loading operation.

Figure 5:
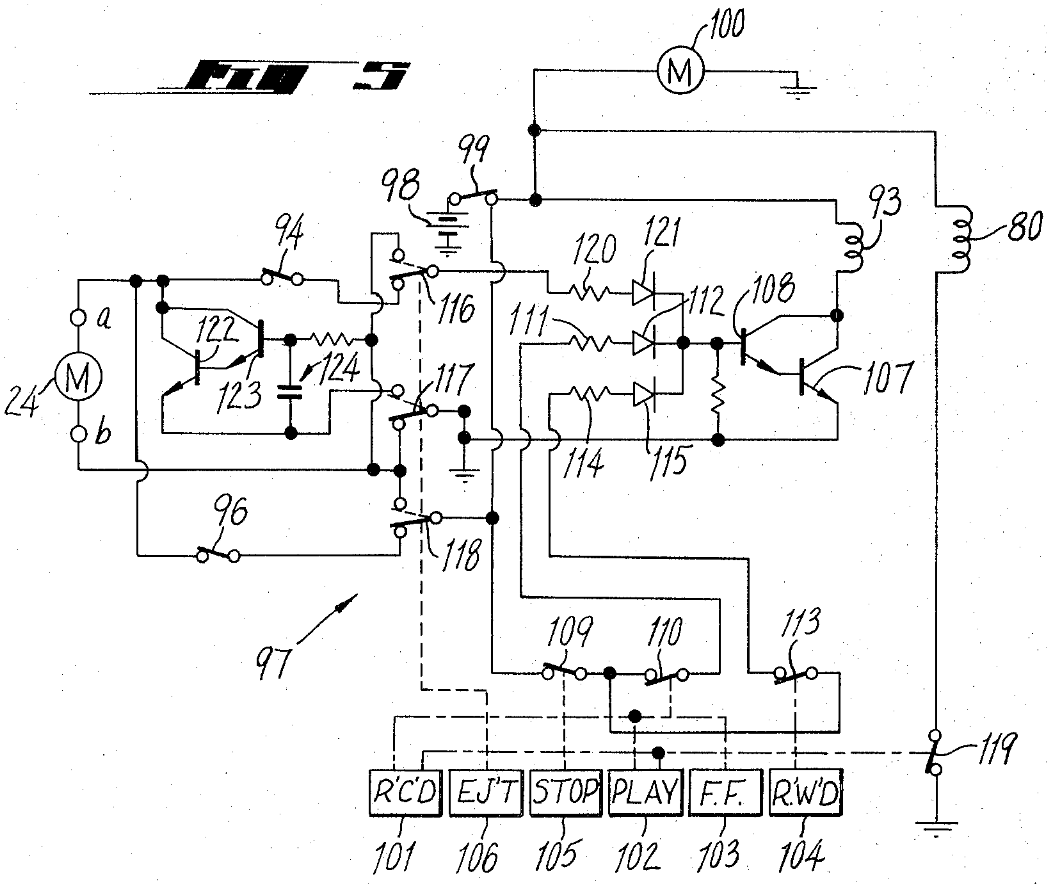
FIG. 5 is a schematic diagram of an electrical control system for the apparatus according to this invention.

Referring now to FIG. 5, it will be seen that the control system for the recording and/or reproducing apparatus according to this invention, which system is represented in block form at 97 on FIG. 1, may comprise an electrical source 98 which is connected through a normally open switch 99 with a circuit for energizing a motor 100 by which the rotary head assembly 1*b* and the capstan 14 are suitably driven, and with circuits for controlling the energization of solenoids 80 and 93 and the operation of motor 24. As shown on FIG. 1, switch 99 is mounted adjacent holder 3 so as to be actuated to its closed condition by a cassette 4 when the latter is disposed in its operation position in the holder. The control system 97 is shown to have manually actuatable pushbuttons 101, 102, 103 and 104 for respectively selecting recording, reproducing or playback, fast-forward and rewinding operations, a push button 105 actuable to halt or stop any of the foregoing operations while leaving the tape in its loaded condition about the guide drum, and a push button 106 actuable for ejecting the tape from the apparatus, that is, for initiating a tape unloading operation by device 20. The push buttons 101, 102, 103 and 104 may be associated with a conventional locking device (not shown) which is effective to retain each of push buttons 101-104 in its depressed or actuated condition after actuation thereof, and which is released in response to actuation of "stop" push button 105 to permit return of the previously actuated push button 101, 102, 103 or 104 to its original or inoperative position.

The circuit for energizing solenoid 93 and thereby releasing braking device 83 is shown to include a switching transistor 107 having its collector-emitter connected in series with solenoid 93 between switch 99 and ground, and being turned ON by a transistor 108 when the base of the latter has a raised potential applied thereto from source 98 by way of switch 99 and a normally closed switch 109 which is opened by actuation of "stop" push button 105, and by way of either a series circuit of normally open switch 110, a resistor 111 and a diode 112 or a series circuit of a normally open switch 113, a resistor 114 and a diode 115 in parallel with the first mentioned series circuit. As indicated schematically, normally open switch 110 is adapted to be closed by actuation of either the "record" push button 101, the "play-back" push button 102 or the "fast-forward" push button 103, while normally open switch 113 is adapted to be closed by actuation of "rewind" push button 104. Thus, solenoid 93 is energized to release braking device 83 and permit rotation of the take-up and supply reels during recording, playback, fast-forward and rewinding operations, and solenoid 93 is de-energized to cause braking device 83 to brake the rotation of the reels whenever any of such operations is halted by actuation of "stop" push button 105.

The "eject" push button 106 is shown schematically to be connected with switches 116–118 which are normally in the positions shown in full lines on FIG. 5, and which are displaced to the positions shown in broken lines in response to the actuation of push button 106. The circuit for energizing motor 24 in the direction from terminal *a* to terminal *b*, that is, for effecting turning of support ring 21 during a tape loading operation of device 20, extends from switch 99 through switch 118 in its normal position and closed switch 96 to motor terminal *a* and from motor terminal *b* through switch 117 in its normal position to ground. Further, a series circuit of closed switch 94, switch 116 in its normal position, a resistor 120 and a diode 121 extends from motor terminal *a* to the base of transistor 108. Thus, when a cassette 4 is disposed in its operative position in holder 3 and actuates switch 99 to its closed position, motor 24 is operated in the direction for a tape loading operation of device 20 until switch 96 is opened by actuator 95 on ring 21 at the conclusion of such operation. Simultaneously with such operation of motor 24, a raised potential is applied to the base of transistor 108 for turning ON transistor 107 and thereby energizing solenoid 93 until switch 94 is opened by actuator 95 just prior to the completion of the tape loading operation. Thus, braking device 93 is released during the tape loading operation so that reels 5 and 6 may turn freely for the withdrawal of the tape therefrom until just prior to the completion of the tape loading operation, at which time braking device 93 is engaged in response to opening of switch 94 for preventing slackness in the tape when loaded on guide drum 1.

When an ejecting or tape unloading operation of device 20 is selected by actuation of "eject" push button 106 for changing-over switches 116–118, the circuit for operating motor 24 to turn support ring 21 from its active position back to its inactive or starting position extends from source 98 through closed switch 99 and changed-over switch 118 to motor terminal *b*, and from motor terminal *a* through the collector-emitter of a switching transistor 122 and the changed-over switch 117 to ground. The switching transistor 122 is turned ON by a control transistor 123 when the base of the latter has a raised potential applied thereto from changed-over switch 118 by way of a delay circuit 124. The raised potential is also applied to the base of transistor 108 for turning ON transistor 107 and thereby energizing solenoid 93 by way of changed-over switches 118 and 116, resistor 120 and diode 121. Thus, upon the actuation of "eject" push button 106, braking device 83 is immediately released to permit rotation of one or both of reels 5 and 6 for taking up the tape as the latter is unloaded from guide drum 1, and motor 24 is operated in the direction for the tape unloading operation only after a suitable interval determined by delay circuit 124 for ensuring that the braking device 83 is already released. Thus, slack in the tape is avoided during the tape unloading operation as well as during the tape loading operation.

As is further shown schematically on FIG. 6, the "record" push button 101 and the "play back" push button 102 may be actuable to close a normally open switch 119 which is interposed in series with switch 99 and solenoid 80 in the circuit for energizing the latter. Thus, solenoid 80 is energized to cause actuating arm 69 to press pinch roller 28 against capstan 14 only during a recording operation or a playback or reproducing operation. At all other times, solenoid 80 is de-energized so that latch member 81 on arm 69 locks or securely holds pinch roller 28 at a safe distance from capstan 14. Therefore, capstan 14 can be continuously rotated by motor 100 so long as a cassette 4 is in its operative position to close switch 99, as shown, without the danger that the tape will be inadvertently gripped between pinch roller 28 and the rotated capstan during other modes of operation, for example, during tape loading or unloading operations, during fast-forward or rewinding operations, during a pause in a recording, reproducing, fast-forward or rewinding operation achieved by actuation of "stop" push button 105, or during so-called still reproduction.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention.

What is claimed is:

1. In a magnetic recording and/or reproducing apparatus that includes a cylindrical tape guide drum with at least one rotary magnetic head moved in a circular path substantially coiniciding with the periphery of said drum, tape supply means containing a magnetic tape, holder means spaced from said guide drum for receiving and positioning said tape supply means, and a capstan spaced from said guide drum: the combination of a tape loading and unloading device comprising support means rotatable around said drum between inactive and active positions in an arcuate path that extends adjacent said holder means and said capstan, tape engaging means including a pinch roller mounted on said support means and being movable with the latter in said arcuate path for engaging the tape contained by the tape supply means positioned on said holder means with said support means in said inactive position and for withdrawing a progressively extended loop of said tape from said supply means and wrapping the extended tape loop about at least a portion of said periphery of the guide drum in response to movement of said support means to said active position at which said pinch roller is located within said tape loop adjacent said capstan with the tape of said loop therebetween; and actuating means for said pinch roller operative only during recording and reproducing operations of said apparatus for pressing said pinch roller against said capstan so that the latter drives the tape therebetween and being otherwise effective for securely holding said pinch roller away from said capstan with said support means in said active position.

2. A magnetic recording and/or reproducing apparatus according to claim 1; in which said support means includes a support ring rotatable about said guide drum between said active and inactive positions, and mounting means carrying said pinch roller and being movable on said ring for displacement of said pinch roller toward and away from said capstan; and in which said actuating means includes an actuating member mounted adjacent said ring at a location near to said pinch roller in said active position of said ring and being movable between first and second positions relative to said ring, means operative during said recording and reproducing operations for moving said actuating member to said first position at which it acts against said mounting means and presses said pinch roller against said capstan, and means otherwise operative for moving said actuating member to said second position at which it blocks the displacement of said pinch roller toward said capstan.

3. A magnetic recording and/or reproducing apparatus according to claim 2; in which said means for moving said actuating member to said second position includes spring means urging said actuating member to said second position with a force sufficient to overcome a force urging said pinch roller toward said capstan in response to increased tension in said tape during fast-forward and rewinding operations of said apparatus, and said means for moving said actuating member to said first position includes electro-magnetic means energized during said recording and reproducing operations for exerting a force on said actuating member that overcomes said force of the spring means.

4. A magnetic recording and/or reproducing apparatus according to claim 2; in which said capstan is disposed at one side of said support ring, said actuating member is mounted at the other side of said support ring and is displaced toward said one side in said first position and away from said one side in said second position, and said actuating member has an abutment thereon engageable against said mounting means when displaced toward said one side and a latch member engageable in the direction toward said other side when the actuating member is in said second position.

5. A magnetic recording and/or reproducing apparatus according to claim 4; in which said mounting means includes a support arm pivoted on said ring and carrying an axle engageable by said abutment and on which said pinch roller is rotatably mounted, and a tape engaging pin also extending from said support arm and having an end portion engageable by said latch member.

6. A magnetic recording and/or reproducing apparatus according to claim 5; in which said end portion of the tape engaging pin is frusto-conical so as to taper away from the free end thereof.

7. A magnetic recording and/or reproducing apparatus according to claim 5; in which said support arm is yieldably urged to a rest position relative to said ring in which said axle and said end portion of the tape engaging pin clear said abutment and said latch member during movement of said ring to and from said active position with said actuating member in said second position thereof.

8. A magnetic recording and/or reproducing apparatus according to claim 1; in which said tape loading and unloading device and said guide drum are relatively arranged so that the extended tape loop, when wrapped about said periphery of the guide drum, is arranged helically about the latter, and said guide drum has a flange at the end thereof to prevent removal of the tape at said end of the guide drum when the tape tension is increased at the initiation of fast-forward and rewinding operations of the apparatus.

9. A magnetic recording and/or reproducing apparatus according to claim 1; in which said tape supply means includes take-up and supply reels on which the tape is wound from which the tape is withdrawn for said progressively extended loop; and further comprising braking means for resisting rotation of said reels, means for releasing said braking means during rotation of said support means from said inactive position toward said active position, and means for engaging said braking means during the final increment of rotation of said support means to said active position.

10. A magnetic recording and/or reproducing apparatus according to claim 9; in which said braking means includes spring means for normally engaging said braking means and a solenoid energizable for releasing said braking means, said means for releasing the braking means during said rotation of the support means includes an energizing circuit for said solenoid having a normally closed switch therein, and said means for engaging the braking means during said final increment of rotation includes a switch actuating member on said support means engageable with said switch to open the latter during said final increment of rotation.

11. A magnetic recording and/or reproducing apparatus according to claim 10; in which there is a reversible electric motor operable for effecting the rotation of the support means between said inactive and active positions, and circuit means actuable for operating said motor in the direction for rotating said support means from said inactive position to said active position and including a normally closed switch opened by said switch actuating member when said support means attains said active position.

12. A magnetic recording and/or reproducing apparatus according to claim 11; in which there is circuit means actuable for energizing said solenoid to release said braking means and for operating said motor in the direction for rotating said support means from said active position to said inactive position, and including delay means for delaying such operation of said motor for a predetermined period to ensure release of said braking means.

* * * * *